G. W. DAVIS.
Ice-Cream Freezer.
No. 28,354. Patented May 22, 1860.
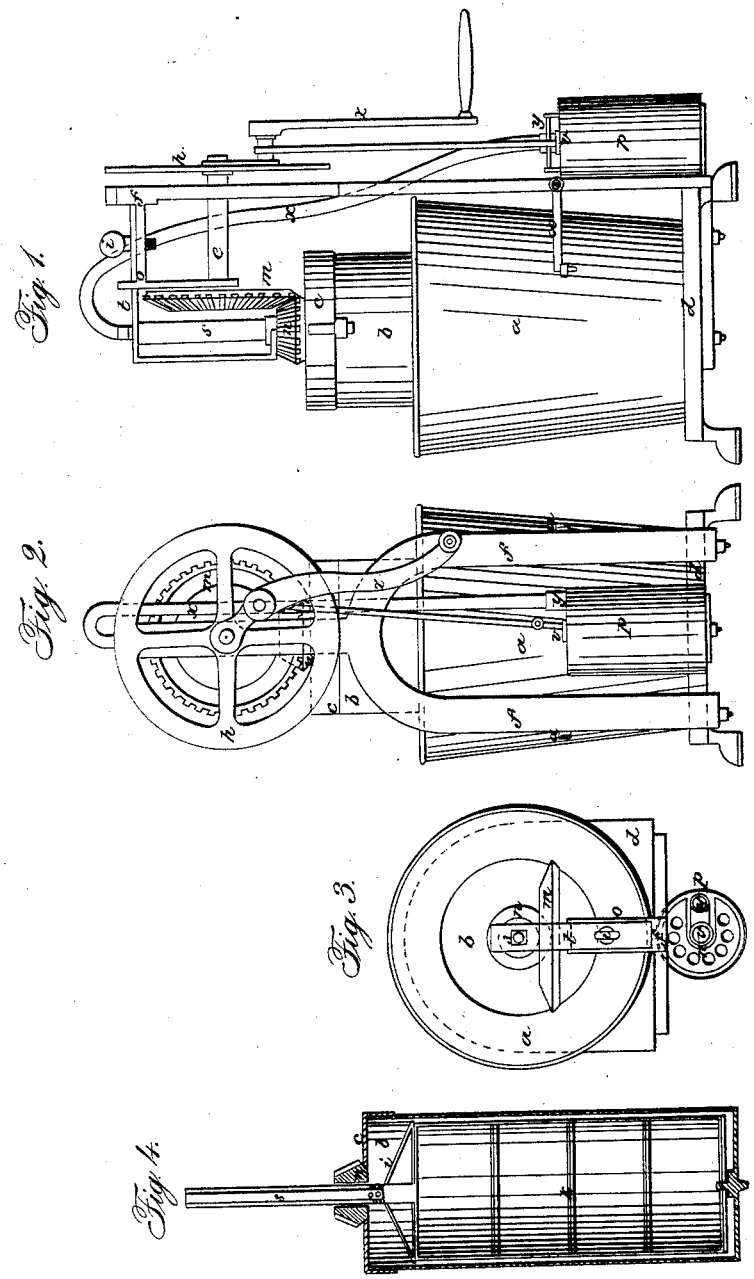
Witnesses:
Inventor:

UNITED STATES PATENT OFFICE.

G. W. DAVIS, OF NEW ORLEANS, LOUISIANA.

ICE-CREAM FREEZER.

Specification of Letters Patent No. 28,354, dated May 22, 1860.

*To all whom it may concern:*

Be it known that I, G. W. DAVIS, of the city of New Orleans and State of Louisiana, have made a new and useful Improvement in Ice-Cream Freezers; and I hereby declare that the following is a full, clear, and exact description thereof, reference being had to the accompanying drawings, and to the letters of reference marked thereon, making a part of this specification, the same letters being used to designate the same parts shown in the respective figures, in which—

Figure 1 is a side elevation in full. Fig. 2 an end elevation. Figs. 3 and 4 are explanatory views which will be referred to in the general description.

The vessel which contains ice, marked $a$, is mounted on the base, $d$, jointed to frame, $f$, by hooks, $a'$, can be made of any material suitable to contain ice. In this is the cylinder, $b$, which Fig. 4, is a section view of, having a pintle on the bottom, that works in a step, made and placed in the center of the bottom of the ice tub, for it to turn in. The upper end of this cylinder has pinion, $n$, attached, that is driven by wheel, $m$, mounted on shaft, $e$, which also is mounted in frame, $f$, and hanger, $o$, see Fig. 1, having fly wheel, $h$, and crank handle, $z$. On hanger, $o$, is mounted guide, $t$, held permanent by set screw, $i$, that receives the upper end of pipe, $s$, which end is square, see Fig. 3, fitting a corresponding square socket in, $t$, so $s$ is held stationary while the cylinder, $b$, is revolving, as stated, the pinion, $n$, passing over the pipe, as it is joined to the cap, $c$, of the cylinder, and held in position by hooks, $c'$, see Fig. 1, so all move together.

In the interior of the cylinder, $b$, is the frame, K, which agitates the cream as the cylinder revolves. This frame has a pintle at its base for its center in the cylinder, and is joined to pipe, $s$, at its upper end, which has a cap, $r$, made conical, over which the cream flows and is discharged near the circumference, or body of the cylinder to be in proximity to the ice. The opening in pipe, $s$, terminates above, $r$, through small openings, as indicated in Fig. 4. Joined to the base, $d$, is the vessel, P, into which the cream is placed, preparatory to going into the cylinder, $b$. This vessel is but a receptacle. It has within it a pump, V, and discharge pipe, $y$, with a continuing, X, that can be a flexible pipe, which conducts the cream into the upper end of pipe, $s$, the pump being actuated on by the turning of the wheel, which also moves the dasher, $u$, in P, to there agitate the cream before being pumped up. The pump sending the cream into the cylinder, $b$, continuously, and at the same time the action of freezing is going on, the congelation will be rapid, and efficient. The frame, K, is but a skeleton; having sides, ends, and cross bars. It is not important if not made of this particular form, so long as it remains stationary during the time the cylinder is revolving, for the purpose of mixing the cream.

What I claim as new, and desire to secure by Letters Patent, is—

The vessel, P, pump, V, pipes, X, and S, in combination with cylinder, $b$, when arranged and operated as, or substantially as, and for the purpose set forth.

G. W. $\times$ DAVIS.
his   mark

Witnesses:
HENRY S. ARMSTRONG,
A. G. BRICE.